(12) United States Patent
Orue Orue

(10) Patent No.: US 12,448,973 B2
(45) Date of Patent: Oct. 21, 2025

(54) HYDRAULIC SYSTEM FOR A HOUSEHOLD APPLIANCE

(71) Applicant: COPRECI, S.COOP., Aretxabaleta (ES)

(72) Inventor: Rodrigo Orue Orue, Zigoitia (ES)

(73) Assignee: COPRECI, S.COOP., Aretxabaleta (ES)

(*) Notice: Subject to any disclaimer, the term of this patent is extended or adjusted under 35 U.S.C. 154(b) by 174 days.

(21) Appl. No.: 18/524,371

(22) Filed: Nov. 30, 2023

(65) Prior Publication Data

US 2024/0209860 A1    Jun. 27, 2024

(30) Foreign Application Priority Data

Dec. 26, 2022  (EP) .................................. 22383289

(51) Int. Cl.
*F04D 15/00* (2006.01)
*A47L 15/42* (2006.01)
(Continued)

(52) U.S. Cl.
CPC ......... *F04D 15/0066* (2013.01); *F04D 13/06* (2013.01); *F04D 15/0005* (2013.01); *F04D 15/0022* (2013.01); *F04D 15/0209* (2013.01); *F04D 15/0218* (2013.01); *F04D 29/4293* (2013.01); *F04D 29/708* (2013.01); *F15B 15/18* (2013.01); *F16K 15/03* (2013.01);
(Continued)

(58) Field of Classification Search
CPC .. F04D 15/0218; F04D 13/06; F04D 15/0209; F04D 15/0066; F04D 15/0005; F04D 29/4293; F04D 15/0022; F16K 37/0041; F16K 15/03; Y10T 137/8242; Y10T 137/7898
See application file for complete search history.

(56) References Cited

U.S. PATENT DOCUMENTS 3,819,297 A * 6/1974 East ................... F04D 15/0209
415/201
3,857,277 A * 12/1974 Moore .................... G01F 1/26
116/276
(Continued)

FOREIGN PATENT DOCUMENTS

DE    102008029910 A1    12/2009
DE    102015224657 A1    6/2017
(Continued)

OTHER PUBLICATIONS

European Search Report, EP22383289, Jun. 9, 2023, 15 pages.

*Primary Examiner* — Peter J Bertheaud
(74) *Attorney, Agent, or Firm* — Edell, Shapiro & Finnan, LLC

(57) ABSTRACT

A hydraulic system for a household appliance which includes a pump that is driven by an electric motor, an outlet conduit in fluid communication with an outlet of the pump, a magnetic check valve having a flap and a control unit. The control unit is configured to control the speed of the electric motor in a closed loop and to determine whether the flap of the check valve is in an open position or in a closed position based on the torque of the electric motor estimated from the current consumption of the electric motor and/or the voltage in the terminals of the electric motor.

20 Claims, 7 Drawing Sheets

(51) Int. Cl.
*A47L 15/46* (2006.01)
*D06F 39/08* (2006.01)
*D06F 103/14* (2020.01)
*D06F 103/42* (2020.01)
*D06F 103/48* (2020.01)
*D06F 105/46* (2020.01)
*D06F 105/52* (2020.01)
*D06F 105/58* (2020.01)
*F04D 13/06* (2006.01)
*F04D 15/02* (2006.01)
*F04D 29/42* (2006.01)
*F04D 29/70* (2006.01)
*F15B 15/18* (2006.01)
*F16K 15/03* (2006.01)
*F16K 37/00* (2006.01)
*G08B 21/18* (2006.01)
*H02P 21/20* (2016.01)

(52) U.S. Cl.
CPC ...... *F16K 37/0033* (2013.01); *F16K 37/0041* (2013.01); *G08B 21/18* (2013.01); *H02P 21/20* (2016.02); *A47L 15/4225* (2013.01); *A47L 15/46* (2013.01); *A47L 2401/07* (2013.01); *A47L 2401/08* (2013.01); *A47L 2501/05* (2013.01); *A47L 2501/26* (2013.01); *A47L 2501/36* (2013.01); *D06F 39/085* (2013.01); *D06F 2103/14* (2020.02); *D06F 2103/42* (2020.02); *D06F 2103/48* (2020.02); *D06F 2105/46* (2020.02); *D06F 2105/52* (2020.02); *D06F 2105/58* (2020.02); *Y10T 137/7898* (2015.04); *Y10T 137/8242* (2015.04)

(56) References Cited

U.S. PATENT DOCUMENTS

| | | | | |
|---|---|---|---|---|
| 4,499,347 | A * | 2/1985 | Richards | H01H 35/40 200/81.9 M |
| 5,483,227 | A * | 1/1996 | Kuo | G01F 23/74 340/623 |
| 6,114,823 | A * | 9/2000 | Doner | F16K 37/0033 318/647 |
| 6,273,684 | B1 * | 8/2001 | Jensen | H01H 35/405 417/43 |
| 8,313,305 | B2 * | 11/2012 | Bevington | F04B 49/002 417/43 |
| 2017/0188783 | A1 | 7/2017 | Geda et al. | |
| 2022/0117460 | A1 | 4/2022 | Jaske et al. | |

FOREIGN PATENT DOCUMENTS

| | | |
|---|---|---|
| EP | 2580505 B1 | 11/2016 |
| KR | 20060063392 A | 6/2006 |

* cited by examiner

HYDRAULIC SYSTEM FOR A HOUSEHOLD APPLIANCE

CROSS-REFERENCE TO RELATED APPLICATIONS

This application relates to and claims the benefit and priority to European Application No. EP22383289.0, filed Dec. 26, 2022.

TECHNICAL FIELD

The present invention relates to a hydraulic system for a household appliance, and to a control method for controlling a hydraulic system of a household appliance.

BACKGROUND

Hydraulic systems comprising a pump, an outlet conduit connected to the outlet of said pump, and a check valve, are known. A check valve is a type of valve which allows flow circulation in one direction of passage and prevents flow circulation in the opposite direction.

For example, check valves comprising a flap pivoting between an open position in which it allows flow circulation in a direction of passage, and a closed position in which the flap prevents flow circulation in the direction opposite the direction of passage, are known. On one hand, conventional check valves in which the flap allows flow passage in a direction of passage with practically zero resistance are known. On the other hand, magnetic check valves which, in order to allow flow passage in a direction of passage, must overcome a magnetic force which retains the flap in the closed position, are known. EP2580505A2 relates to a magnetic check valve of this type.

SUMMARY

Disclosed is a hydraulic system for a household appliance and a control method for controlling a hydraulic system of a household appliance.

A first aspect of the invention relates to a hydraulic system for a household appliance, preferably for a washing machine or a dish washer.

The hydraulic system comprises a pump, an outlet conduit connected to the outlet of said pump, and a check valve.

The check valve comprises a support surface and a flap pivotably coupled to said support surface, the flap and the support surface comprising ferromagnetic properties. At least said flap or said support surface comprises a permanent magnet, a magnetic check valve thereby being obtained.

The flap is configured to pivot between an open position in which it allows the circulation of a fluid driven by the pump through said outlet conduit, and a closed position in which the flap is supported on the support surface such that it prevents the circulation of said fluid through said outlet conduit.

The hydraulic system also comprises a control unit.

The pump comprises a BLDC-type, BLAC-type, or PMSM-type motor. The control unit is configured to control the speed of the motor in a closed loop.

Furthermore, the control unit is configured to determine whether the flap of the check valve is in the open position or in the closed position based on an estimated torque of the motor, said torque of the motor being estimated from the current consumption of the motor and/or the voltage in the terminals of the motor.

As explained above, a magnetic check valve allows obtaining a hydraulic system which, in addition to ensuring that the fluid can only circulate in the direction of passage, offers a closing force that only allows the flap to be opened once the magnetic force which retains the flap in the closed position is overcome. In that sense, if in a conventional check valve the flap transitions from the closed position to the open position exerting a minimum pressure, in the case of the magnetic check valve, the pressure required is higher, and therefore it is important to ensure that the flap has transitioned to the open position to achieve a proper operation of the hydraulic system.

The hydraulic system of the invention allows detecting the position in which the flap is arranged without having to add additional sensors such as, for example, pressure sensors, flow rate sensors, etc., which allow the control unit to determine the position in which the flap of the check valve is arranged.

Since the control unit is configured to control the motor of the pump in a closed speed loop, said control unit is configured to establish a setpoint speed and to keep the rotor rotating at said setpoint speed regardless of the load variation in the motor shaft. By keeping the rotational speed of the motor of the pump constant, an increase in the flow rate to be driven by the pump requires an increase in the torque of the motor. When the flap of the check valve is in closed position, the flow rate driven by the pump is zero. However, when the flap transitions from the closed position to the open position, the flow rate driven by the pump increases and therefore the torque of the motor also increases. As mentioned above, the control unit is configured to determine whether the flap of the check valve is in the open position or in the closed position based on an estimated torque of the motor. The control unit is configured to estimate the torque of the motor from the current consumption of the motor and/or the voltage in the terminals of the motor. The way for estimating the torque of the motor will depend on the control method used to control the motor. In that sense, to estimate the torque of the motor, some of the parameters calculated by the control unit to control and power the motor are preferably used, said parameters being calculated from the measurement of the current consumption of the motor or the voltage in the terminals of the motor. Parameters inherent to the motor control method are thereby used to enable determining the transition of the flap from the closed position to the open position.

When choosing the pump of the hydraulic system and establishing the opening speed at which said pump must work to generate a pressure on the flap which enables the opening of the flap, the magnetic force of the check valve to be overcome is taken into account. In normal operating conditions, upon operating the pump at said opening speed, the flap will transition from the closed position to the open position. However, in abnormal operating conditions, for example due to excessive friction, a blocked hinge, etc., working at said opening speed may not be sufficient to transition the flap from the closed position to the open position.

The possibility of being able to detect the position in which the flap of the check valve is arranged means that the motor of the pump does not have to be oversized, since the alternative to being able to detect whether the flap pivots from the closed position to the open position would be to provide an oversized pump which allows exerting a pressure greater than that necessary to overcome the magnetic force of the check valve in order to ensure that the flap will pivot from the open position, even when there is an additional impediment. However, this solution, besides being more expensive due to the use of an oversized pump, does not allow knowing the position of the flap.

A second aspect of the invention relates to a control method for controlling a hydraulic system of a household appliance, preferably a control method for controlling a hydraulic system of a washing machine or a dish washer.

The hydraulic system to be controlled comprises a pump, an outlet conduit connected to the outlet of said pump, and a check valve. The check valve comprises a support surface and a flap pivotably coupled to said support surface, the flap and the support surface comprising ferromagnetic properties, at least said flap or said support surface comprising a permanent magnet. The flap is configured to pivot between an open position in which it allows the circulation of a fluid driven by the pump through said outlet conduit, and a closed position in which the flap is supported on the support surface such that it prevents the circulation of said fluid through said outlet conduit. The pump comprises a BLDC-type, BLAC-type, or PMSM-type motor.

The control method controls the speed of the motor in a closed loop. Furthermore, the control method determines whether the flap of the check valve is in the open position or in the closed position based on estimating the torque of the motor from the current consumption of the motor and/or the voltage in the terminals of the motor.

These and other advantages and features of the invention will become apparent in view of the figures and detailed description.

DETAILED DESCRIPTION

Figure 1:
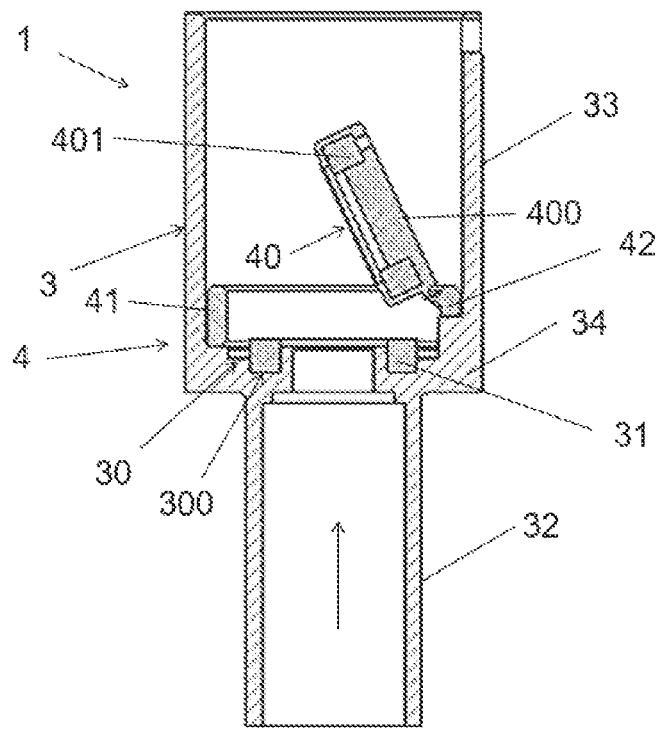
FIG. 1 shows a first partial view of a hydraulic system according to a first embodiment, in which the flap is arranged in an open position.

A first aspect of the invention relates to a hydraulic system 1 for a household appliance, particularly for a washing machine or a dish washer.

The hydraulic system 1 comprises a pump 2, an outlet conduit 3 connected to the outlet of said pump 2, and a check valve 4.

The check valve 4 comprises a support surface 30 and a flap 40 pivotably coupled to said support surface 30. Both the flap 40 and the support surface 30 comprise ferromagnetic properties, at least said flap 40 or said support surface 30 comprising a permanent magnet. Preferably, both the flap 40 and the support surface 30 comprise a permanent magnet.

The flap 40 is configured to pivot between an open position in which it allows the circulation of a fluid driven by the pump 2 through said outlet conduit 3, and a closed position in which the flap 40 is supported on the support surface 30 such that it prevents the circulation of said fluid through said outlet conduit 3. In the context of the invention, the flap 40 shall be deemed open when it is arranged in the open position and therefore allows the passage of the fluid driven by the pump 2, where the flap 40 can adopt different degrees of inclination with respect to the support surface 30 when it is arranged in said open position. Furthermore, in the context of the invention, the flap 40 shall be deemed closed when it is arranged in the closed position.

The hydraulic system also comprises a control unit (not shown in the figures).

The pump 2 comprises a motor 20, said motor 20 a being BLDC-type motor, a BLAC-type motor, or a PMSM-type motor.

The control unit is configured to control the speed of the motor 20 in a closed loop, this type of control of the BLDC-type, BLAC-type, and PMSM type motors being extremely well known to one skilled in the art, and different control methods are known to achieve same. Preferably, the hydraulic system comprises a PWM inverter configured to feed the motor 20, the control unit being configured to control said inverter. Based on the desired rotational speed of the motor 20, i.e., the setpoint speed, the desired alternating current frequency is established at the outlet of the inverter, since the rotational speed in motors of this type is proportional to the frequency of the voltage fed thereto.

The control unit is configured to estimate the torque of the motor 20 from the current consumption of the motor 20 (either the current measured in the terminals of the motor 20 or the current measured in the return of the DC bus feeding the inverter which powers the motor 20) and/or from the voltage measured in the terminals of the motor 20, and to determine whether the flap 40 of the check valve 4 is in the open position or in the closed position based on said estimated torque of the motor 20.

In the context of the invention, estimated torque of the motor refers to a direct or indirect estimate of said torque, i.e., the control unit can monitor a parameter which reflects the torque of the motor to enable determining the position in which the flap 40 is arranged without having to directly calculate the torque of the motor. Preferably, the torque of the motor is estimated by means of the effective current of the motor.

For controlling the speed of the motor 20 in a closed loop, the control unit is configured to establish a setpoint speed and to keep the rotor rotating at said setpoint speed regardless of the load variation in the motor shaft. In that sense, by keeping the rotational speed constant, an increase in the flow rate driven by the pump 2 requires an increase in the torque of the motor 20. When the flap 40 of the check valve 4 is in the closed position, the flow rate driven by the pump is zero. However, when the flap 40 transitions to the open position, the flow rate driven by the pump 2 will increase, and therefore the torque of the motor 20 will also increase. Based on the control method used, said increase in torque can be estimated by different ways.

Preferably, the control unit is configured to operate the motor 20 at an opening speed $f_4$ to open the flap 40 of the check valve 4, i.e., so that the flap 40 pivots from the closed position to the open position, driving the fluid such that it generates a pressure on the flap 40 which generates a force that overcomes the magnetic force between said flap 40 and the support surface 30. Furthermore, the control unit is configured to operate the motor 20 at a circulating speed $f_1$ less than the opening speed $f_4$ if it detects that the flap 40 of the check valve 4 has opened. The control unit is configured to determine that the flap 40 has opened if it detects an increase in the estimated torque of the motor 20.

Preferably, if the opening of the flap 40 is not detected, i.e., an increase in the estimated torque of the motor 20 is not detected after operating at the opening speed for a predetermined time $f_4$, the control unit is configured to operate the motor 20 at a maximum speed greater than the opening speed $f_4$ for a predetermined time and to operate the motor 20 at the circulating speed $f_1$ if it detects that the flap 40 of the check valve 4 has opened with the motor 20 operating at the maximum speed.

Preferably, the control unit is configured to activate an alarm in the case of detecting a failed opening of the flap 40 of the check valve 4.

Figure 7:
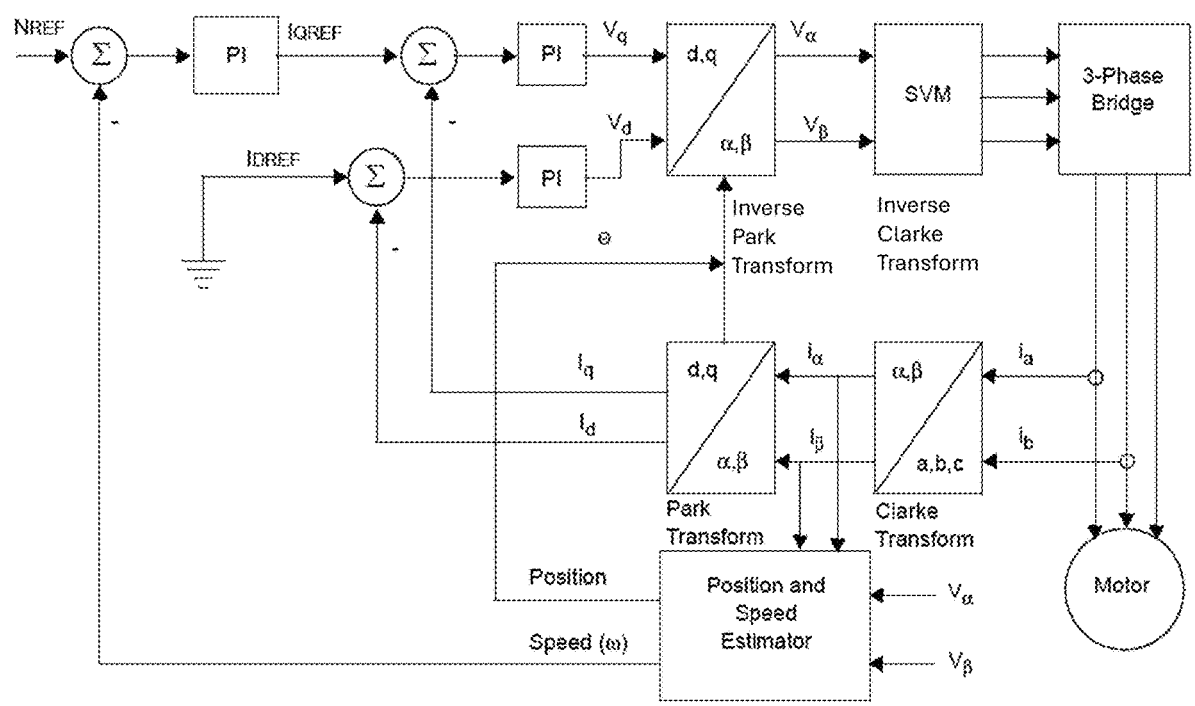
FIG. 7 shows a block diagram of a way to execute the vectorial control method of a BLDC-type, BLAC-type, or PMSM-type motor.

Preferably, the control unit is configured to control the motor 20 following the vectorial control method, also known as FOC ("Field Oriented Control"). FIG. 7 shows by way of non-limiting example a control diagram according to the vectorial control method. The vectorial control method is based on the transformation of the three-phase stationary system consisting of currents measured in the terminals of the motor 20, also referred to as stator currents, into a two-phase rotary system in which currents $I_d$ and $I_q$ are defined. Currents $I_q$ and $I_d$ are therefore obtained with the vectorial control method based on the currents measured in the terminals of the motor 20, after applying the Clarke and Park transforms. The axis "q" is the axis of the torque of the motor 20 and the magnetic field of the stator must develop along this axis. The axis "d" refers to the direct axis of the rotor flow. Current $I_q$ therefore refers to the torque of the motor and allows calculating the effective current of the motor. By monitoring current $I_q$ or the effective current calculated based on said current $I_q$, the torque of the motor and its evolution can thus be estimated, detecting an increase in the torque of the motor by means of an increase in said current $I_q$ or said effective current. In the vectorial control method, other values such as voltages $V_d$ and $V_q$ are calculated based on the aforementioned currents $I_d$ and $I_q$. The control unit could also estimate the torque of the motor 20 based on said voltages $V_d$ and $V_q$ since they also allow estimating the evolution of the torque of the motor.

Figure 8:
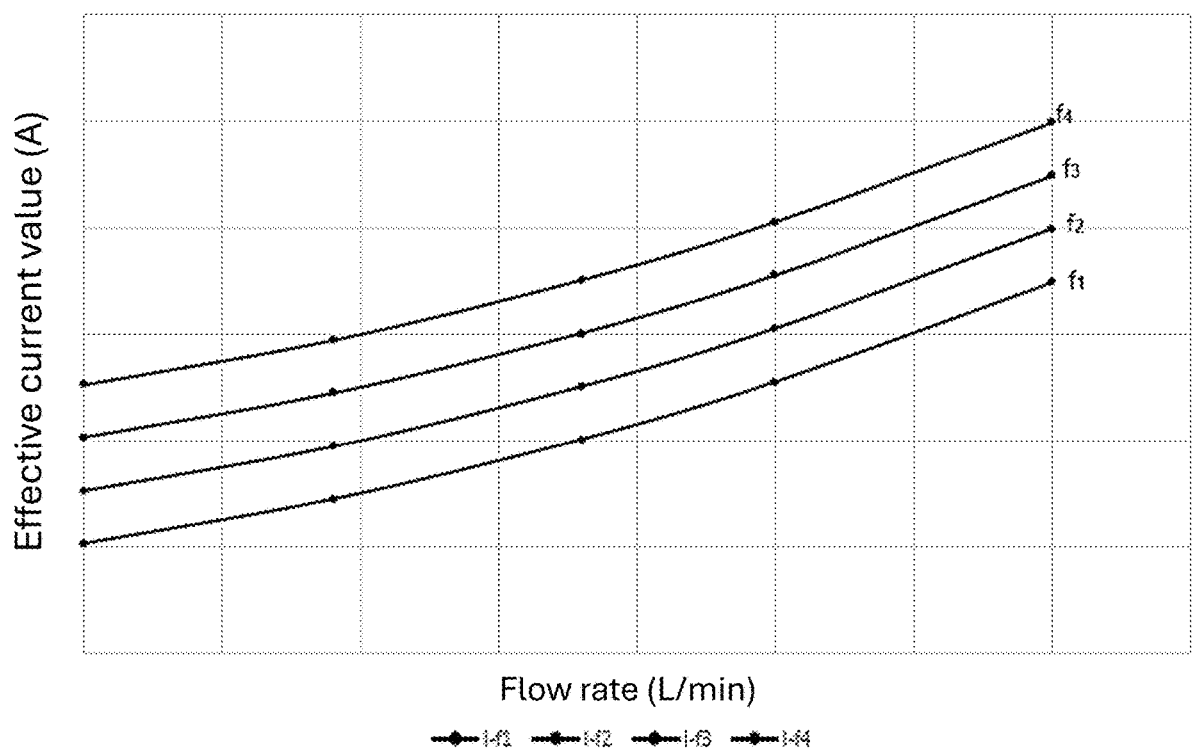
FIG. 8 shows, by way of example, a graph linking the effective current of the motor and the flow rate of the pump in steady state for different motor speeds.

FIG. 8 shows by way of example the relationship between the effective current of a BLDC-type, BLAC-type, or PMSM-type motor and the flow rate driven by the pump for different power supply frequencies of the motor, i.e., for different rotational speeds ($f_1$, $f_2$, $f_3$, $f_4$) of the motor.

Figure 9:
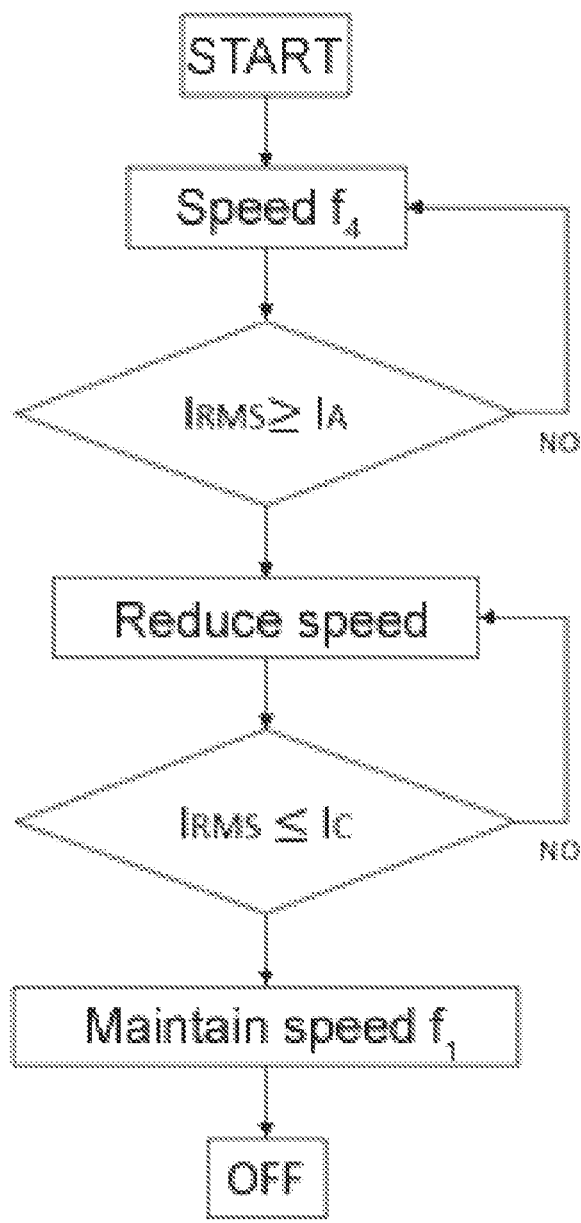
FIG. 9 shows a block diagram of a control method according to one embodiment.
Figure 10:
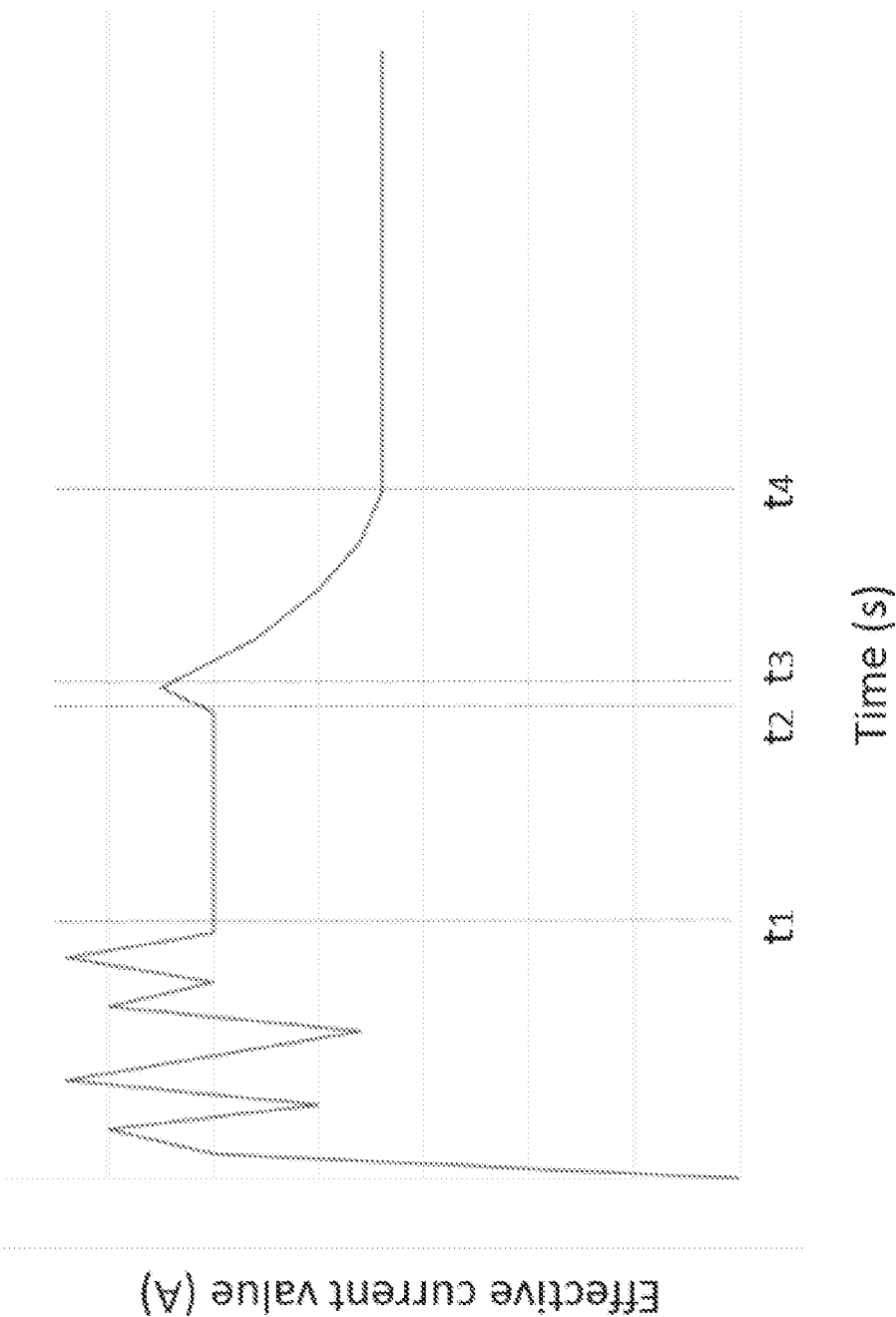
FIG. 10 shows the evolution over time of the effective current value of the motor of the pump in a hydraulic system controlled according to the control method of FIG. 9.

FIG. 10 shows by way of example the evolution over time of the effective current value of the motor 20 of the pump 2 when said motor 20 is put into operation with the flap 40 being in the closed position and the control unit being configured to detect the opening of the flap 40 and to actuate the motor 20 of the pump 2 according to the flow chart shown in FIG. 9. In this way, when the motor 20 is put into operation, after a first transient interval in which the motor 20 is in the open loop, once the motor is controlled in a closed loop, i.e., starting from instant $t_1$, the effective current value is kept constant while the flap 40 is closed, i.e., while the flow rate driven by the pump 2 is zero. At the moment when the pressure generated by the fluid driven by the pump 2 overcomes the magnetic force between the flap 40 and the support surface 30, i.e., in instant $t_2$, the flap 40 pivots from the closed position to the open position, and the effective current value starts to rise due to the increase in the flow rate driven by the pump 2. As mentioned above, this increase in the effective current reflects an increase in the torque of the motor. In instant $t_3$, when the effective current value reaches a predetermined opening current value $I_A$, the control unit estimates that the increase in torque indicating that the flap 40 has pivoted to the open position has taken place, and therefore the control unit is configured to determine that the flap 40 has opened. Once the opening of the flap 40 has been determined, the control unit is configured to gradually reduce the setpoint speed to a circulating speed, i.e., to instant $t_4$. The change in setpoint speed is reflected in a progressive decrease of the effective current value until reaching a circulating current value $I_C$ in which it remains constant when said circulating speed is reached.

Alternatively, the control unit controls the motor 20 following the six-step control method. If the motor is controlled according to the six-step control method, by means of the work cycle of the inverter powering the motor 20, also known as PWM duty cycle, an estimate of the torque of the motor 20 and its evolution can be performed. Said estimate can be perfected by combining the work cycle with the current measurement in the terminals of the motor or with the current in the return of a DC bus which is the DC input to the inverter that powers the motor 20.

Preferably, the support surface 30 of the check valve 4 is a surface of the outlet conduit 3. Preferably, the outlet conduit 3 is made in a material which has no ferromagnetic properties. Preferably, the support surface 30 comprises at least one housing 300 in which at least one fixed ferromagnetic part 31 with ferromagnetic properties is arranged, the fixed ferromagnetic part 31 preferably being a ring-shaped part and said fixed ferromagnetic part 31 more preferably being a magnet.

Preferably, the flap 40 comprises an elastomeric portion 400 made of an elastomer and a movable ferromagnetic part 401 with ferromagnetic properties which is embedded in the elastomeric portion 400, said movable ferromagnetic part 401 preferably comprising a ring shape. Preferably, the elastomeric portion 400 is over-injected on the movable ferromagnetic part 401. Alternatively, the elastomeric portion 400 can comprise a housing in which the movable ferromagnetic part 401 is inserted.

More preferably, the support surface 30 comprises an annular-shaped housing 300 in which a ring-shaped fixed ferromagnetic part 31 is arranged, and the flap 40 comprises a ring-shaped movable ferromagnetic part 401 with ferromagnetic properties which is embedded in an elastomeric portion 400, with the fixed ferromagnetic part 31 and the movable ferromagnetic part 401 being arranged together when the flap 40 is arranged in the closed position.

Preferably, the pump 2 is part of a self-cleaning filtering device 5 comprising an inlet conduit 50, a main outlet 51, and a sludge outlet 52 connected to the outlet conduit 3. The self-cleaning filtering device 5 comprises an outlet chamber 53 communicated with the main outlet 51, an inlet chamber 54 at least partially surrounding the outlet chamber 53 and communicated with the inlet conduit 50, and a filtering element 55 separating the inlet chamber 54 from the outlet chamber 53. The filtering element 55 is configured to operate in a filtering mode in which the filtering element 55 is kept immobile and filters the fluid circulating from the inlet chamber 54 to the outlet chamber 53. The filtering element 55 is also configured to operate in a self-cleaning mode in which the filtering element 55 rotates such that the particles adhered to the outer surface of the filtering element 55 come off as a result of the centrifugal force generated. The pump 2 comprises an impeller 21 which is arranged inside the self-cleaning filtering device 5. The outlet of the motor 20 is coupled to the impeller 21 and to the filtering element 55, said impeller 21 being configured to drive the sludge generated in the self-cleaning mode to the sludge outlet 52. The control unit is configured to activate the self-cleaning mode of the self-cleaning filtering device 5.

Figure 2:
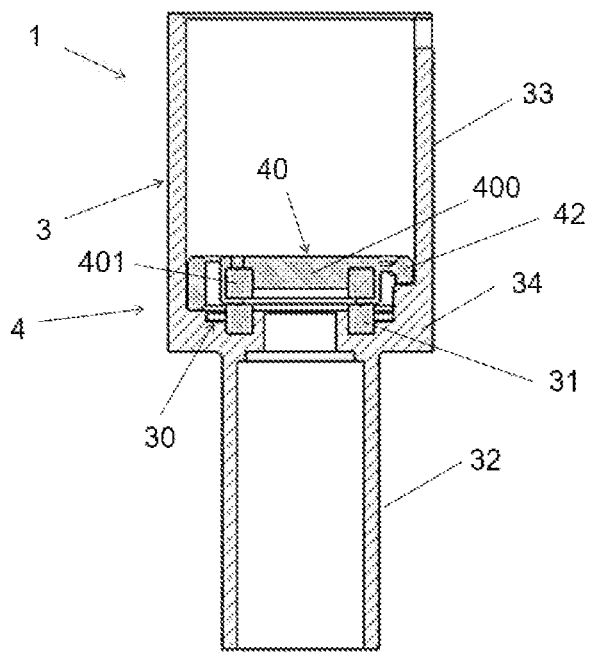
FIG. 2 shows a second partial view of the hydraulic system of FIG. 1, in which the flap is arranged in a closed position.
Figure 3:
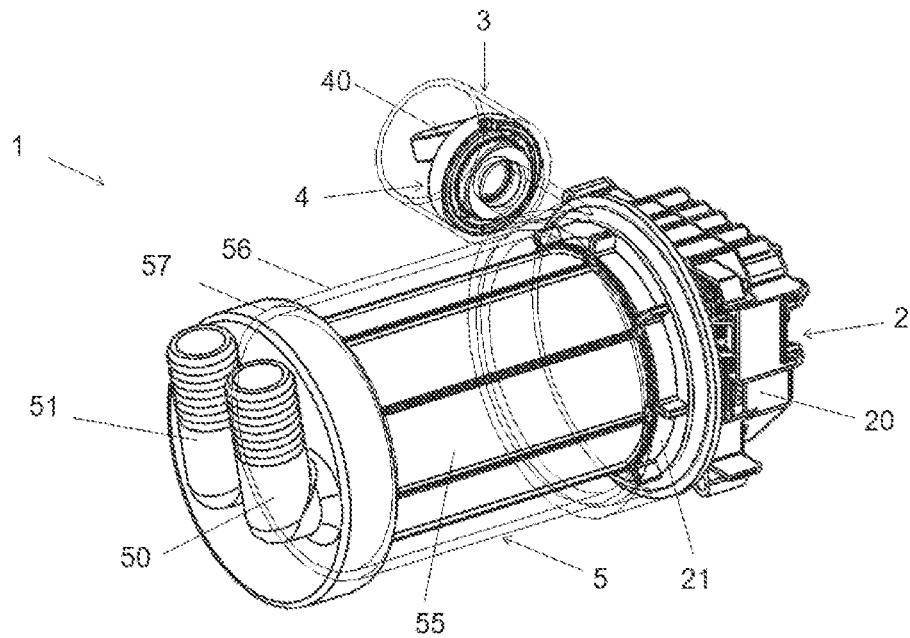
FIG. 3 shows a perspective view of the hydraulic system according to a second embodiment, in which the flap is arranged in an open position.
Figure 4:
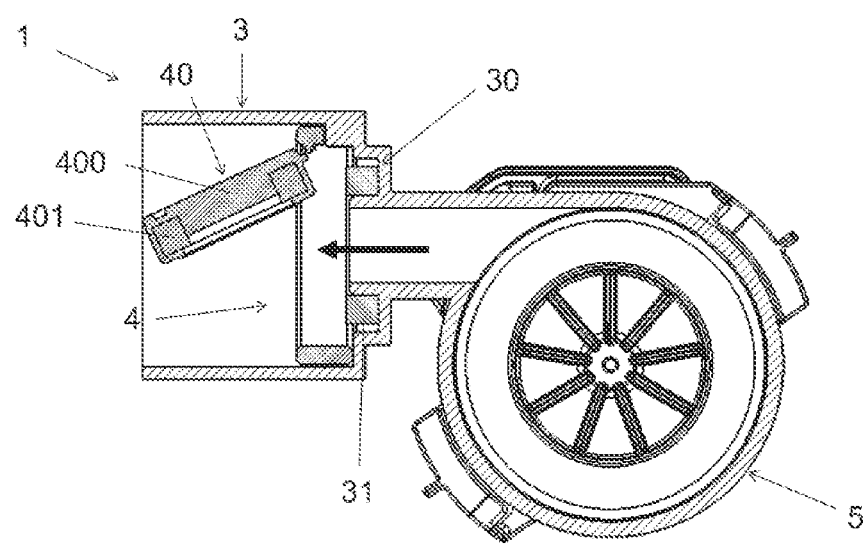
FIG. 4 shows a first section view of the hydraulic system of FIG. 3, in which the flap is arranged in an open position.
Figure 5:
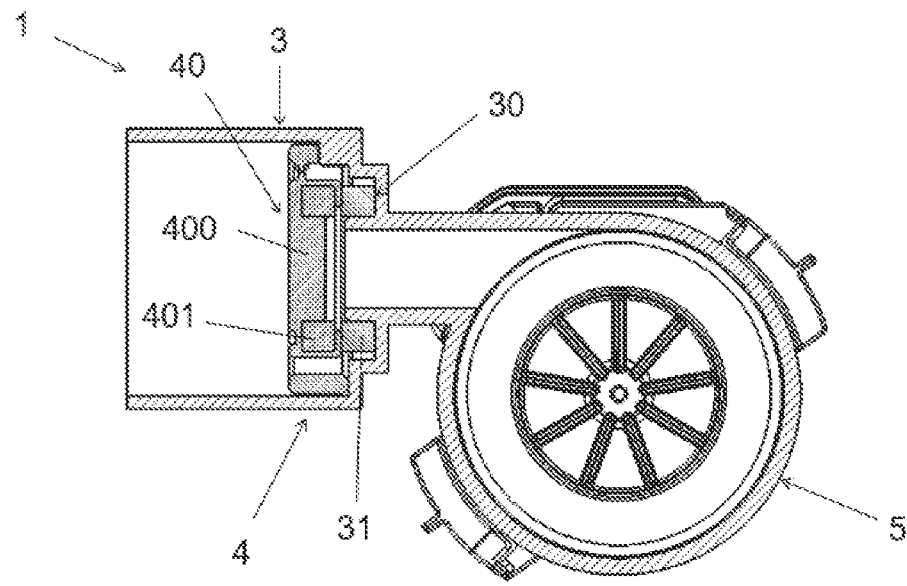
FIG. 5 shows a second section view of the hydraulic system of FIG. 3, in which the flap is arranged in a closed position.
Figure 6:
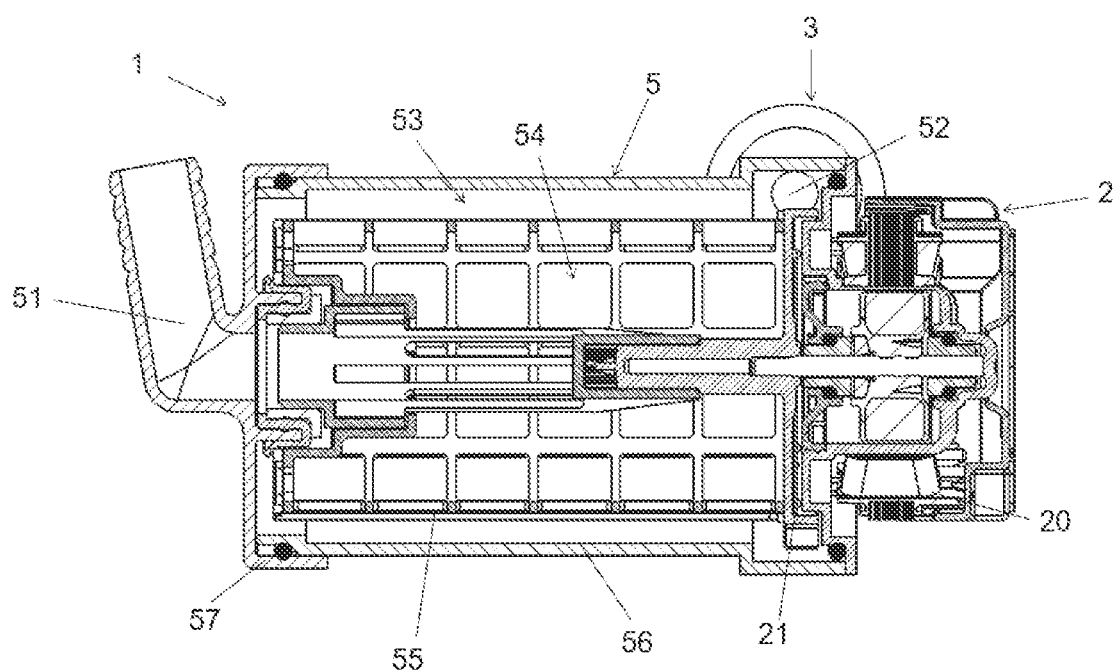
FIG. 6 shows a third section view of the hydraulic system of FIG. 3.

FIGS. 1 and 2 show a first embodiment of the hydraulic system according to the invention.

The hydraulic system 1 comprises a pump (not shown in the figures) comprising a BLDC-type, BLAC-type, or PMSM-type motor, an outlet conduit 3 connected to the outlet of said pump, and a check valve 4.

The check valve 4 comprises a support surface 30 and a flap 40 pivotably coupled to said support surface 30. Both the flap 40 and the support surface 30 comprise ferromagnetic properties. In this first embodiment, the flap 40 and the support surface 30 comprise a permanent magnet.

The flap 40 is configured to pivot between an open position, as shown in FIG. 1, in which it allows the circulation of a fluid driven by the pump through said outlet conduit 3 in the direction of passage, and a closed position, as shown in FIG. 2, in which the flap 40 is supported on the support surface 30 such that it prevents the circulation of said fluid through said outlet conduit 3. The direction of passage is indicated in FIG. 1 by means of an arrow.

The hydraulic system also comprises a control unit (not shown in the figures).

Said control unit is configured to estimate the torque of the motor from the current consumption of the motor (either the current measured in the terminals of the motor or the current measured in the return of the DC bus powering the inverter which powers the motor) and/or from the voltage measured in the terminals of the motor, and to determine whether the flap 40 of the check valve 4 is in the open position or in the closed position based on said estimated torque of the motor.

In this first embodiment, the support surface 30 of the check valve 4 is a surface of the outlet conduit 3. The outlet conduit 3 comprises a first segment 32 connected to the outlet of the pump, an intermediate segment 34 after the first segment 32, and a second segment 33 after the intermediate segment 34. The support surface 30 is a surface of the intermediate segment 34.

In this first embodiment, the support surface 30 comprises an annular-shaped housing in which a ring-shaped fixed ferromagnetic part 31 with ferromagnetic properties is arranged, the fixed ferromagnetic part 31 being a magnet.

In this first embodiment, the flap 40 comprises an elastomeric portion 400 made of an elastomer and a movable ferromagnetic part 401 with ferromagnetic properties which is embedded in the elastomeric portion 400. In this first embodiment, the elastomeric portion 400 comprises a housing in which the movable ferromagnetic part 401 is inserted. In other embodiments not shown in the figures, the elastomeric portion 400 can be over-injected on the movable ferromagnetic part 401.

In this first embodiment, the check valve also comprises a fixed part 41. The flap 40 is pivotably coupled to the fixed part 41 by means of an attachment part 42 which acts as a hinge between the fixed part 41 and the flap 40. Preferably, both the fixed part 41 and the attachment part 42 are made of the same material as the flap 40, with the fixed part 41, the attachment part 42, and the flap 40 forming a single part.

In this first embodiment, the fixed part 41 is arranged fitted into the second segment 33 of the outlet conduit 3 and supported on the support surface 30, such that the fixed ferromagnetic part 31 and the movable ferromagnetic part 401 are arranged together when the flap 40 is arranged in the closed position. Since the movable ferromagnetic part 401 is embedded in the elastomeric portion 400, when the flap 40 is arranged in the closed position, it is the elastomer of the elastomeric portion 400 which is supported on the fixed ferromagnetic part 31, thereby ensuring a leak-tight closure.

FIGS. 3 to 6 show a second embodiment of the hydraulic system 1 according to the invention.

In this second embodiment, the hydraulic system 1 comprises a self-cleaning filtering device 5, a pump 2 which is part of the self-cleaning filtering device 5, an outlet conduit 3, and a check valve 4.

In this second embodiment, the check valve 4 and the outlet conduit 3 have the same features as those of the first embodiment, and therefore it is not considered necessary to describe them again.

In this second embodiment, the self-cleaning filtering device 5 comprises a substantially cylindrical casing 56 which is open at both ends. Furthermore, the self-cleaning filtering device 5 comprises a flap 57 arranged at a first end of the casing 56, with the pump 2 being arranged at a second end of the casing 56.

In this second embodiment, the self-cleaning filtering device 5 comprises an inlet conduit 50 and a main outlet 51 which are arranged in the flap 57, and a sludge outlet 52 connected to the outlet conduit 3, with the sludge outlet 52 being arranged in the casing 56 close to the second end.

In this second embodiment, the self-cleaning filtering device 5 comprises inside the casing 56 an outlet chamber 53 communicated with the main outlet 51, and an inlet chamber 54 at least partially surrounding the outlet chamber 53 and communicated with the inlet conduit 50.

In this second embodiment, the self-cleaning filtering device 5 also comprises a filtering element 55 arranged inside the casing 56, with said filtering element 55 separating the inlet chamber 54 from the outlet chamber 53.

The filtering element 55 is configured to operate in a filtering mode in which the filtering element 55 is kept immobile and filters the fluid circulating from the inlet chamber 54 to the outlet chamber 53, and a self-cleaning mode in which the filtering element 55 rotates such that the particles adhered to the outer surface of the filtering element 55 come off as a result of the centrifugal force generated.

In this second embodiment, the pump 2 comprises an impeller 21 which is arranged inside the casing 56 of the self-cleaning filtering device 5 after the filtering element 55. The outlet of the motor 20 of the pump 2 is coupled to the impeller 21 and to the filtering element 55. The impeller 21 is configured to drive the sludge generated in the self-cleaning mode to the sludge outlet 52.

In this second embodiment, when the self-cleaning filtering device 5 is operating in the filtering mode, the motor 20 of the pump 2 remains immobile and the flap 40 remains in the closed position due to the magnetic force of the check valve 4.

In this second embodiment, the control unit is configured to activate the self-cleaning mode of the self-cleaning filtering device 5. Therefore, when the control unit activates the self-cleaning mode of the self-cleaning filtering device 5, the control unit operates the motor 20 at an opening speed $f_4$, such that both the filtering element 55 and the impeller 21 rotate at said opening speed $f_4$. Due to the centrifugal force generated, the particles adhered to the outer surface of the filtering element 55 come off, generating sludge which is driven by the impeller 21 to the outlet conduit 3 through the sludge outlet 52. When the sludge driven by the pump 2 generates a pressure on the flap 40 which overcomes the magnetic force between the flap 40 and the support surface 30, the flap 40 transitions to the open position, and therefore the sludge can circulate through the outlet conduit 3. As explained above, the control unit is configured to estimate the torque of the motor 20 from the current consumption of the motor 20 (either the current measured in the terminals of the motor 20 or the current measured in the return of the DC bus which powers the inverter powering the motor 20) and/or the voltage in the terminals of the motor 20, and to determine whether the flap 40 of the check valve 4 is in the open position or in the closed position based on said estimated torque of the motor 20.

In this second embodiment, when the flap 40 opens, the control unit is configured to operate the motor 20 at a circulating speed $f_1$ less than the opening speed $f_4$.

In this second embodiment, in the case where an increase in the estimated torque of the motor 20 is not detected after operating at the opening speed $f_4$ for a predetermined time, the control unit is configured to operate the motor 20 at a maximum speed greater than the opening speed $f_4$ for a predetermined time, and to operate the motor 20 at the circulating speed $f_1$ if it detects that the flap 40 of the check valve 4 has opened with the motor 20 operating at the maximum speed.

In this second embodiment, the control unit is configured to activate an alarm in the case of detecting a failed opening of the flap 40 of the check valve 4.

A second aspect of the invention relates to a control method for controlling a hydraulic system of a household appliance, particularly a washing machine or a dish washer.

The method of the invention is configured to be applied in a hydraulic system such as the one described above and all the considerations made for the hydraulic system are applicable to the control method of the invention.

The control method controls the speed of the motor 20 in a closed loop. Furthermore, the control method determines whether the flap 40 of the check valve 4 is in the open position or in the closed position based on estimating the torque of the motor 20 from the current consumption of the motor 20 and/or the voltage in the terminals of the motor 20.

Preferably, the control method comprises an opening step in which the motor 20 is operated at an opening speed $f_4$ to open the flap 40 of the check valve 4, driving the fluid such that it generates a pressure on the flap 40 which overcomes the magnetic force between said flap 40 and the support surface 30, and, if it is detected that the flap 40 has opened, a circulating step in which the motor 20 is operated at a circulating speed $f_1$ less than the opening speed $f_4$. The consumption of the pump 2 can thus be optimized since once it is ensured that the flap 40 is open, and therefore that the magnetic force between the flap 40 and the support surface 30 has been overcome, the setpoint speed of the motor 20, and therefore the power consumption of the motor 20, can be reduced, maintaining the desired flow rate in the pump 2. In the opening step, the control method determines that the flap 40 has opened if an increase in the estimated torque of the motor 20 is detected. As explained above, in the context of the invention, the estimated torque refers to a direct or indirect estimate, i.e., the control method can monitor a parameter which reflects the torque of the motor so as to enable determining the position in which the flap 40 is arranged without having to directly calculate the torque of the motor. Preferably, the control method estimates the torque of the motor by means of the effective current of the motor.

Preferably, in the opening step, if it is determined that the flap 40 has not opened after a predetermined time interval, the motor 20 is operated at a maximum speed greater than the opening speed $f_4$ for a predetermined time, transitioning to the circulating step if an increase in the estimated torque of the motor 20 is detected.

Preferably, an alarm is activated in the case of a failed opening of the flap 40 of the check valve 4 in the opening step.

Preferably, the control of the speed of the motor 20 in a closed loop is performed according to the FOC vectorial method, for example according to the block diagram shown in FIG. 7. As mentioned above, the vectorial control method is based on the transformation of the three-phase stationary system consisting of currents measured in the terminals of the motor 20 into a two-phase rotary system in which currents $I_d$ and $I_q$ are defined. In this case, the torque of the motor 20 can be estimated indirectly by means of monitoring the value $I_q$ calculated in said vectorial control method or by monitoring the effective current value of the motor 20 calculated by means of said current $I_q$. The torque of the motor 20 can also be estimated indirectly by means of the values $V_q$ and $V_d$ calculated in said FOC vectorial method.

Alternatively, the control unit controls the motor 20 following the six-step control method. If the motor is controlled according to the six-step control method, by means of the work cycle of the inverter powering the motor 20 calculated from the voltage in the terminals of the motor, also known as PWM duty cycle, an estimate of the torque of the motor 20 and its evolution can be performed. Said estimate can be perfected by combining the work cycle with the current measurement in the terminals of the motor or with the current in the return of a DC bus which is the DC input to the inverter that powers the motor 20.

Preferably, an alarm is activated in the case of a failed opening of the flap 40 of the check valve 4 in the opening step.

FIG. 9 shows a block diagram which shows a preferred embodiment of the control method according to the invention. In said preferred embodiment of the control method, the effective current value of the motor 20 is monitored. When the motor 20 is put into operation, the opening speed $f_4$ is established as the setpoint speed, and as long as the effective current does not exceed a preestablished opening current value $I_A$ the motor is kept rotating at said opening speed $f_4$ as the setpoint speed. Once the opening current value $I_A$ is exceeded, the setpoint speed of the motor 20 gradually decreases as long as the effective current value of the motor 20 is greater than a preestablished circulating current value $I_B$. Once the current is below said circulating current value $I_B$, the control method keeps the motor 20 rotating at the setpoint circulating speed $f_1$.

Additional embodiments are disclosed in the clauses that follow.

Clause 1. Hydraulic system for a household appliance, said hydraulic system (1) comprising
   a pump (2),
   an outlet conduit (3) connected to the outlet of said pump (2), and a check valve (4) comprising a support surface (30) and a flap (40) pivotably coupled to said support surface (30), the flap (40) and the support surface (30) comprising ferromagnetic properties, at least said flap (40) or said support surface (30) comprising a permanent magnet, said flap (40) being configured to pivot between
an open position in which it allows the circulation of a fluid driven by the pump (2) through said outlet conduit (3), and
a closed position in which the flap (40) is supported on the support surface (30) such that it prevents the circulation of said fluid through said outlet conduit (3),
the hydraulic system comprising a control unit,
the pump (2) comprises a BLDC-type, BLAC-type, or PMSM-type motor (20),
the control unit being configured to control the speed of the motor (20) in a closed loop, and to determine whether the flap (40) of the check valve (4) is in the open position or in the closed position based on the torque of the motor (20) estimated from the current consumption of the motor (20) and/or the voltage in the terminals of the motor (20).

Clause 2. Hydraulic system according to clause 1, wherein the control unit is configured to operate the motor (20) at an opening speed ($f_4$) to open the flap (40) of the check valve (4), driving the fluid such that it generates a pressure on the flap (40) which overcomes the magnetic force between said flap (40) and the support surface (30), and to operate the motor (20) at a circulating speed ($f_1$) less than the opening speed ($f_4$) if it detects that the flap (40) of the check valve (4) has opened, the control unit being configured to determine that the flap (40) has opened if it detects an increase in the estimated torque of the motor (20).

Clause 3. Hydraulic system according to clause 2, wherein, in the case where an increase in the estimated torque of the motor (20) is not detected after operating at the opening speed ($f_4$) for a predetermined time, the control unit is configured to operate the motor (20) at a maximum speed greater than the opening speed ($f_4$) for a predetermined time, and to operate the motor (20) at the circulating speed ($f_1$) if it detects that the flap (40) of the check valve (4) has opened with the motor (20) operating at the maximum speed.

Clause 4. Hydraulic system according to any of the preceding clauses, wherein the control unit is configured to control the motor (20) according to the FOC vectorial control method, the control unit being configured to estimate the torque of the motor (20) based on the value $I_q$ or the values $V_q$ and $V_d$ calculated in said vectorial control method from the currents in the terminals of the motor.

Clause 5. Hydraulic system according to any of clauses 1 to 3, wherein the control unit is configured to control the motor (20) according to the six-step control method, the control unit being configured to estimate the torque of the motor (20) based on the work cycle calculated in said control method from the voltage in the terminals of the motor, and/or from the currents in the terminals of the motor, or from the current in the return of a DC bus which is the input to an inverter powering the motor (20).

Clause 6. Hydraulic system according to any of clauses 1 to 5, wherein the control unit is configured to activate an alarm in the case of detecting a failed opening of the flap (40) of the check valve (4).

Clause 7. Hydraulic system according to any of clauses 1 to 6, wherein the support surface (30) of the check valve (4) is a surface of the outlet conduit (3), said support surface (30) comprising at least one housing (300) in which at least one fixed ferromagnetic part (31) with ferromagnetic properties is arranged, the fixed ferromagnetic part (31) preferably being a ring-shaped part.

Clause 8. Hydraulic system according to any of clauses 1 to 7, wherein the flap (40) comprises an elastomeric portion (400) made of an elastomer and a movable ferromagnetic part (401) with ferromagnetic properties which is embedded in the elastomeric portion (400), said movable ferromagnetic part (401) preferably comprising a ring shape, and the elastomeric portion (400) preferably being over-injected on the movable ferromagnetic part (401) or the movable ferromagnetic part (401) preferably being inserted in a housing of the elastomeric portion (400).

Clause 9. Hydraulic system according to any of clauses 1 to 8, wherein the pump (2) is part of a self-cleaning filtering device (5) comprising an inlet conduit (50), a main outlet (51), and a sludge outlet (52) connected to the outlet conduit (3), the self-cleaning filtering device (5) comprising
an outlet chamber (53) communicated with the main outlet (51),
an inlet chamber (54) at least partially surrounding the outlet chamber (53) and communicated with the inlet conduit (50), and
a filtering element (55) separating the inlet chamber (54) from the outlet chamber (53), the filtering element (55) being configured to operate in
a filtering mode in which the filtering element (55) is kept immobile and filters the fluid circulating from the inlet chamber (54) to the outlet chamber (53), and
a self-cleaning mode in which the filtering element (55) rotates such that the particles adhered to the outer surface of the filtering element (55) come off as a result of the centrifugal force generated,
the pump (2) comprising an impeller (21) which is arranged inside the self-cleaning filtering device (5), the outlet of the motor (20) being coupled to the impeller (21) and to the filtering element (55), said impeller (21) being configured to drive the sludge generated in the self-cleaning mode to the sludge outlet (52), and
the control unit being configured to activate the self-cleaning mode of the self-cleaning filtering device (5).

Clause 10. Control method for controlling a hydraulic system of a household appliance, the hydraulic system comprising
a pump (2),
an outlet conduit (3) connected to the outlet of said pump (2), and
a check valve (4) comprising a support surface (30) and a flap (40) pivotably coupled to said support surface (30), the flap (40) and the support surface (30) comprising ferromagnetic properties, at least said flap (40) or said support surface (30) comprising a permanent magnet, said flap (40) being configured to pivot between
an open position in which it allows the circulation of a fluid driven by the pump (2) through said outlet conduit (3), and
a closed position in which the flap (40) is supported on the support surface (30) such that it prevents the circulation of said fluid through said outlet conduit (3),
the pump (2) comprises a BLDC-type, BLAC-type, or PMSM-type motor (20), the speed of the motor (20) being controlled in a closed loop, and whether the flap (40) of the check valve (4) is in the open position or in the closed position being determined based on estimating the torque of the motor (20) from the current consumption of the motor (20) and/or the voltage in the terminals of the motor (20)

Clause 11. Control method according to clause 10, comprising an opening step in which the motor (20) is operated at an opening speed ($f_4$) to open the flap (40) of the check valve (4), driving the fluid such that it generates a pressure on the flap (40) which overcomes the magnetic force between said flap (40) and the support surface (30), and, if it is detected that the flap (40) has opened, a circulating step in which the motor (20) is operated at a circulating speed ($f_1$) less than the opening speed ($f_4$), with the flap (40) being determined as having opened in the opening step if an increase in the estimated torque of the motor (20) is detected.

Clause 12. Control method according to clause 11, wherein, in the opening step, if it is determined that the flap (40) has not opened after a predetermined time interval, the motor (20) is operated at a maximum speed greater than the opening speed ($f_4$) for a predetermined time, transitioning to the circulating step if an increase in the estimated torque of the motor (20) is detected.

Clause 13. Control method according to clause 11 or 12, wherein an alarm is activated in the case of a failed opening of the flap (40) of the check valve (4) in the opening step.

Clause 14. Control method according to any of clauses 10 to 13, wherein controlling the speed of the motor (20) in a closed loop is performed according to the FOC vectorial method, the torque of the motor (20) being estimated based on the value Iq or the values Vq and Vd calculated in said FOC vectorial method from the currents in the terminals of the motor (20).

Clause 15. Control method according to any of clauses 10 to 13, wherein controlling the speed of the motor (20) in a closed loop is performed according to the six-step control method, the torque of the motor (20) being estimated based on the voltage in the terminals of the motor and the currents in the terminals of the stator or the current in the return of a DC bus which is the input to an inverter powering the motor (20).

What is claimed is:

1. A hydraulic system for a household appliance, the hydraulic system comprising:
    a pump having an impeller that when rotated drives a fluid towards a fluid outlet of the pump;
    an outlet conduit connected to and in fluid communication with the fluid outlet of the pump;
    a check valve located in the outlet conduit, the check valve including a support and a flap that is pivotably coupled to the support, the support including a support surface, each of the flap and the support surface comprising ferromagnetic properties with at least one of the flap and support surface comprising a permanent magnet, the flap being configured to pivot between an open position in which the flap is not supported on the support surface, and a closed position in which the flap is supported on the support surface, in the open position the flap allows the fluid to flow through outlet conduit, in the closed position the flap prevents the fluid from flowing through the outlet conduit;
    an electric motor coupled to the pump impeller in such a way that when the electric motor rotates the impeller also rotates; and
    a control unit that is configured to control the speed of the electric motor in a closed loop, the control unit also being configured to monitor current consumption of the electric motor and/or voltage in terminals of the electric motor to determine whether the flap of the check valve is in the open position or in the closed position.

2. The hydraulic system according to claim 1, wherein the electric motor is selected from the group consisting of a BLDC-type, BLAC-type and PMSM-type motor.

3. The hydraulic system according to claim 1, wherein the control unit is configured to operate the electric motor at an opening speed to cause the flap to assume the open position by driving the fluid such that it generates a pressure on the flap which overcomes a magnetic force between the flap and the support surface, and to operate the electric motor at a circulating speed less than the opening speed upon the control unit determining the flap is in the open position.

4. The hydraulic system according to claim 3, wherein the control unit is configured to determine an increase in torque of the electric motor, the control unit being configured to determine that the flap has assumed the open position upon there being a detected increase in the torque of the electric motor.

5. The hydraulic system according to claim 4, wherein, in the case where an increase in the torque of the electric motor is not detected after operating the electric motor at the opening speed for a first predetermined time, the control unit is configured to operate the electric motor at a second speed greater than the opening speed for a second predetermined time.

6. The hydraulic system according to claim 5, wherein the control unit is configured to operate the electric motor at the circulating speed after operating the electric motor at the second speed upon the control unit determining the flap is in the open position.

7. The hydraulic system according to claim 5, wherein the speed greater than the opening speed is a maximum speed of the electric motor.

8. The hydraulic system according to claim 1, wherein the control unit is configured to control the electric motor according to a FOC vectorial control method, the control unit being configured to estimate a torque of the electric motor based on the value $I_q$ or the values $V_q$ and $V_d$ calculated in the vectorial control method from the currents and voltages in the terminals of the electric motor.

9. The hydraulic system according to claim 1, wherein the control unit is configured to control the electric motor according to a six-step control method, the control unit being configured to estimate the torque of the electric motor based on a work cycle calculated in the six-step control method from the voltage in the terminals of the electric motor, and/or from the currents in the terminals of the electrical motor, or from the current in the return of a DC bus which is an input to an inverter powering the electric motor.

10. The hydraulic system according to claim 5, wherein the control unit is configured to activate an alarm upon the flap not assuming the open position after the passage of the second predetermined time.

11. The hydraulic system according to claim 1, wherein the support includes at least one housing in which resides at least one fixed ferromagnetic part that comprises the support surface.

12. The hydraulic system according to claim 11, wherein the support is a part of the outlet conduit.

13. The hydraulic system according to claim 1, wherein the flap comprises an elastomeric portion made of an elastomer and a ferromagnetic part with the ferromagnetic properties which is embedded in the elastomeric portion.

14. The hydraulic system according to claim 1, wherein the impeller of the pump is arranged in a self-cleaning filtering device, the self-cleaning filtering device including an inlet conduit, a main outlet, and a sludge outlet connected to and in fluid communication with the outlet conduit, the self-cleaning filtering device comprising:

an outlet chamber in fluid communication with the main outlet;

an inlet chamber at least partially surrounding the outlet chamber and in fluid communication with the inlet conduit; and a filtering element separating the inlet chamber from the outlet chamber, the filtering element being configured to operate in a filtering mode in which the filtering element is stationary and a self-cleaning mode in which the filtering element rotates, the filtering element and the impeller of the pump being coupled to the electric motor;

the control unit being configured to activate the self-cleaning mode to cause the electric motor to rotate the filtering element and the pump impeller.

15. A control method of a hydraulic system of a household appliance, the hydraulic system comprising:

a pump having an impeller that when rotated drives a fluid towards a fluid outlet of the pump;

an outlet conduit connected to and in fluid communication with the fluid outlet of the pump;

a check valve located in the outlet conduit, the check valve including a support and a flap that is pivotably coupled to the support, the support including a support surface, each of the flap and the support surface comprising ferromagnetic properties with at least one of the flap and support surface comprising a permanent magnet, the flap being configured to pivot between an open position, in which the flap is not supported on the support surface, and a closed position, in which the flap is supported on the support surface, in the open position the flap allows the fluid to flow through outlet conduit, in the closed position the flap prevents the fluid from flowing through the outlet conduit; and an electric motor coupled to the pump impeller in such a way that when the electric motor rotates the impeller also rotates;

the control method comprising controlling the speed of the electric motor in a closed loop, and monitoring current consumption of the electric motor and/or voltage in terminals of the electric motor to determine whether the flap of the check valve is in the open position or in the closed position.

16. The control method according to claim 15, further comprising operating the electric motor at an opening speed to cause the flap to assume the open position by driving the fluid such that it generates a pressure on the flap which overcomes a magnetic force between the flap and the support surface, and operating the electric motor at a circulating speed less than the opening speed upon the flap assuming the open position.

17. The control method according to claim 16, wherein upon there being a detected increase in the torque of the electric motor, determining the flap has assumed the open position.

18. The hydraulic system according to claim 16, wherein, in the case where an increase in the torque of the electric motor is not detected after operating the electric motor at the opening speed for a first predetermined time, operating the electric motor at a second speed greater than the opening speed for a second predetermined time.

19. The control method according to claim 18, further comprising operating the electric motor at the circulating speed after operating the electric motor at the second speed upon the control unit determining the flap is in the open position.

20. The control method according to claim 18, further comprising activating an alarm upon the flap not assuming the open position after the passage of the second predetermined time.

* * * * *